March 12, 1929.  H. F. JONES  1,705,121
COMBINED GAUGE AND SEDIMENT REMOVER
Filed Aug. 16, 1919
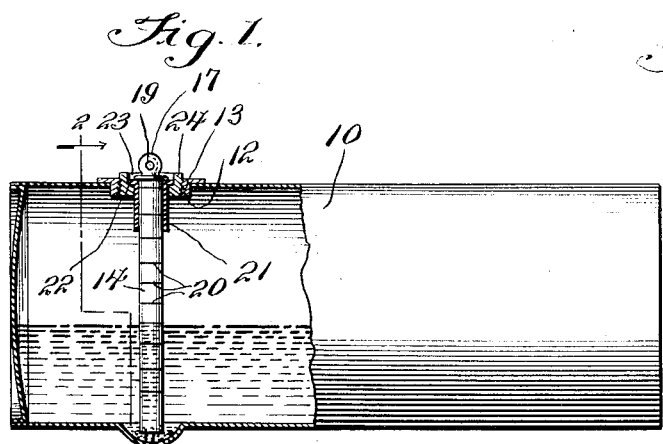
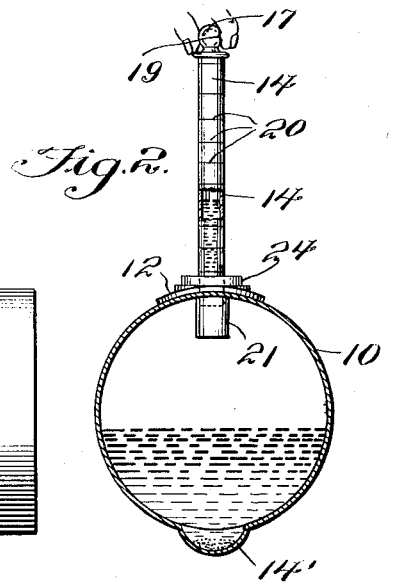
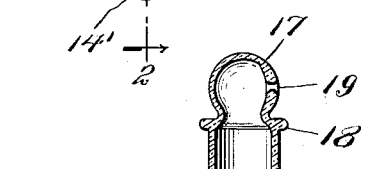
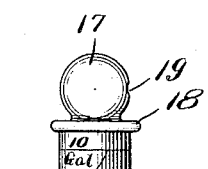
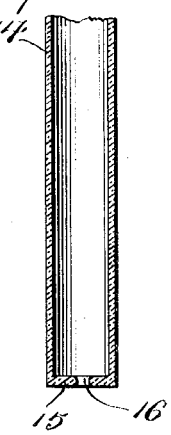
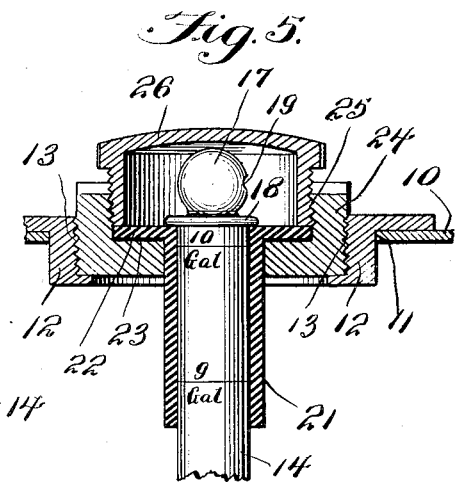
INVENTOR.
Howard F. Jones
BY
Johnson and Johnson
ATTORNEY.

Patented Mar. 12, 1929.

1,705,121

UNITED STATES PATENT OFFICE.

HOWARD F. JONES, OF WARRENTON, NORTH CAROLINA.

COMBINED GAUGE AND SEDIMENT REMOVER.

Application filed August 16, 1919. Serial No. 317,917.

My invention relates to a device for use with the liquid fuel tank of an automobile or the like, and adapted to function as a combined gauge and sediment remover.

An important object of the invention is to provide a device of the above mentioned character, which is simple in construction, inexpensive to manufacture, convenient in use, and which may be installed upon or within the liquid fuel tank without materially altering the construction of the same.

A further object of the invention is to provide means for properly securing the device to the liquid fuel tank, so that it may normally remain therein, during the operation of the automobile.

Other objects and advantages of the invention will be apparent during the course of the following description.

In the accompanying drawings forming a part of this specification and in which like numerals are employed to designate like parts throughout the same, Figure 1 is a side elevation of a device embodying my invention, showing the same in the lowered position within the liquid fuel tank, Figure 2 is a similar view, showing the device elevated, Figure 3 is a central longitudinal sectional view through the device, Figure 4 is a side elevation of the same, and, Figure 5 is an enlarged side elevation of the upper end of the device, associated elements being in section.

In Figures 1, 2 and 5, the numeral 10 designates a liquid fuel tank of an automobile, provided in its upper portion with the usual filling opening 11, receiving a reinforcing flange or ring 12, internally screw-threaded, as shown at 13. The tank 10 is provided in its lower portion, opposite the filling opening 11, with a sediment depression or pocket 14.

The device comprises a tubular member 14, which is preferably formed of transparent material, such as glass, while it may be formed of translucent material, or any other suitable material. At its lower end, this tubular member is provided with a head or disk 15, having a central aperture 16. At its upper end, the tubular member 14, is provided with a preferably spherical head 17, for convenient handling, and an outwardly extending flange 18, at the base of this head. The spherical head 17 is provided upon one side with a horizontal aperture 19, adapted to be covered by one of the fingers holding the spherical head, as shown in Figure 2.

The tubular member 14 is provided with means for indicating the depth of the liquid fuel within the tank, such means preferably being in the form of a scale or graduations 20, preferably indicating the number of gallons of the liquid fuel, this scale thus indicating the units of measurement.

The numeral 21 designates a holding thimble or sleeve, formed of yielding fibrous material, such as rubber. The thimble 21 is provided at its upper end with an annular flange 22 (Figures 1 and 5). The thimble 21 is inserted within an aperture 23 extending through a plug 24 for closing the filling opening, said plug being externally screw-threaded for engagement with the threads 13 of flange 12. The plug 24 is provided with an upper recess 25, affording a space surrounding the spherical head 17, so that it may be conveniently grasped.

The tubular member 14 is adapted to be slidably mounted within the yielding thimble 21, the flange 18 resting upon the flange 22 of the thimble. This thimble serves to prevent the breakage of the tubular member, if formed of glass or the like, and also to prevent rattling. The tubular member 14 is preferably constructed sufficiently long so that its lower end will project into the sediment cup or depression 14', as clearly shown in Figure 1.

By the above described assembly and arrangement of the parts, the tubular member may be partially or wholly removed from the tank independently of the plug 24, the latter only being removed from the tank when it is desired to fill the same or to replenish the supply of liquid fuel therein, in which case the tubular member may be removed prior to unscrewing the plug, or the plug and tubular member may be removed together.

When the tubular member is moved partly or wholly out of the tank 10, with its aperture 19 covered, the liquid fuel contained therein will be held within the same, and the user may observe the height of the liquid fuel therein with respect to the scale 20, and therefore ascertain the height or amount of liquid fuel within the tank 10. If the tubular member 14 is constructed of transparent material, a further advantage is gained, inasmuch as the color and character of the liquid fuel may be observed.

As the lower end of the tubular member is adapted to project into the sediment pocket or depression 14', it is obvious that the device may be advantageously employed in removing the sediment from the liquid fuel, without undue agitation of the same. This operation may be performed separately, or in the use of the device as a gauge, it being sufficient that the device be entirely removed from the tank and emptied.

In case the tank 10 is covered, as in the Ford automobile it is unnecessary to cover the head 17, but where the tank is arranged exteriorly of the car, I preferably cover this head by means of a cap 26, having screw-threaded engagement with the plug 24, as shown in Figure 5.

It is to be understood that the form of my invention herewith shown and described is to be taken as a preferred example of the same, and that various changes in the shape, size, and arrangement of parts may be resorted to without departing from the spirit of my invention, or the scope of the subjoined claims.

Having thus described my invention, I claim:—

1. In a device of the class described, in combination, a liquid fuel tank having a filling opening and a sediment receiving depression in its bottom wall opposite said opening, an apertured closure for said opening, a tubular member slidably mounted in the aperture of said closure and adapted to project into said depression, said tubular member being open at its lower end and having an aperture in its end projecting from said first-named aperture whereby removal of the tubular member, while said last-named aperture is closed by a finger of the user, may remove sediment from said depression together with a measuring column of liquid to indicate the depth of liquid in the tank.

2. In combination, a liquid fuel holding tank having a filling opening therein, an apertured closure in said opening, a one-piece tubular member in the tank slidably mounted in the aperture of said closure and removable from said tank independently of the closure, said tubular member being provided with an inlet opening, a spherical apertured head on the outer end of said tubular member, and a flange adjacent the junction of the head with the remainder of the tubular member to support the tubular member on the closure.

In testimony whereof I affix my signature.

HOWARD F. JONES.